UNITED STATES PATENT OFFICE.

WILHELM MAJERT, OF GRUNAU, GERMANY.

PROCESS OF OBTAINING VANILLIN.

SPECIFICATION forming part of Letters Patent No. 585,584, dated June 29, 1897.

Application filed February 17, 1896. Serial No. 579,617. (No specimens.) Patented in Germany July 22, 1895, No. 82,924; in England February 29, 1896, No. 21, and in France April 28, 1896, No. 253,266.

*To all whom it may concern:*

Be it known that I, WILHELM MAJERT, residing at Grunau, near Berlin, in the Kingdom of Prussia and German Empire, have invented a new and useful Improvement in the Process for the Production of Vanillin, (patented to me in Letters Patent of the Empire of Germany, No. 82,924, dated July 22, 1895; Letters Patent of Great Britain, No. 21, granted February 29, 1896; Letters Patent of France, No. 253,266, granted April 28, 1896,) of which the following is a full, clear, and exact description.

My invention relates to the method of manufacturing vanillin. In the D. R. P., No. 82,924, is described a method for the manufacture of vanillin, the characteristic of which is that the hydroxyl groups of the eugenols is etherized by means of an aromatic alcoholic acid, which again is easily separated. The new combinations contain a free carboxyl group, through the agency of which they form soluble salts, and can be oxidized, when in solution, with neutral or alkaline oxidizing agents. It was of importance to also know such derivatives from the isoeugenols that are not precipitated by acids, and therefore can be oxidized by means of an acid-oxidizing agent while in solution. If care be taken that a sulfo group is present in place of a carboxyl group, the above results will also be obtained. The chlornitrobenzene sulfuric acid, (1-2-4.,) as well as the corresponding bromonitrobenzene sulfuric acid, have proven to be for this particular case especially well-adapted materials. If the sodium salt thereof is permitted to act upon isoeugenol sodium, sodium nitrosulfate of isoeugenol phenylether is produced by the following formula:

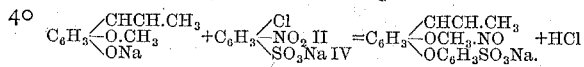

This sodium salt is very soluble in water, and when in weak solution is not precipitated by strong acids. If an oxidizing material is added, the acid will be converted into vanillin phenylether nitrosulfuric acid, which acid, if boiled with caustic soda, will be divided into sodium vanillinate and sodium nitrosulfate of phenal.

I. *Method to produce the isoeugenol phenylether nitrosulfo-acid.*—Dissolve 16.4 kilograms isoeugenol, four kilograms sodium hydroxid, 25.6 kilograms chlornitrobenzene sulfate of sodium, or 30.5 kilograms bromonitrobenzene sulfate of sodium in one hundred and fifty liter of water. Boil continuously, preventing evaporation, for twelve hours. After this time the fluid will be found to be neutral in its reaction. The isoeugenol phenylether nitrobenzene sulfate of sodium is then precipitated by means of common salt as a quickly-solidifying brownish resin. It contains water of crystallization, which is driven off at a temperature of 100° centigrade.

I include chlornitrobenzene sulfate of sodium and bromonitrobenzol sulfate of sodium by the generic term "sodium salt of halogen nitrobenzene sulfo-acid."

II. *Oxidation of the isoeugenol phenylether nitrosulfuric acid.*—The oxidation is best produced in the absence of free mineral acids, because these acids have a polymeric effect on the prophenyl group, the formula of the prophenyl radical being $CH=CH-CH_3$. Boil, preventing evaporation, a solution of 37.6 kilograms isoeugenol phenylether nitrosulfate of sodium, thirty-two kilograms bichromate of sodium in six hundred liter water and add slowly during a time of from twelve to fifteen hours four hundred and forty-five kilograms of sulfuric acid of ten per cent. Keep the solution boiling for about six hours more and then make it alkaline by adding soda. After filtering off the precipitated chromehydroxid the fluid contains vanillin phenylether nitrosulfate of sodium plus sulfate of sodium.

III. *The separation of the vanillin from the sodium salt of vanillin phenylether nitrosulfuric acid.*—To the solution (obtained by Formula II) add ten kilograms sodium hydrate and boil until the yellow coloration produced by the separation of the nitrophenosulfate of sodium does not increase in intensity. Then acidify with diluted sulfuric acid and extract the vanillin with ether. The ethereal extraction is shaken with a solution of sodium bisulfite in water. In this manner the vanillin goes in the watery solution as a double compound with sodium bisulfite. This is separated from the ether and boiled with as much hydrochloric or sulfuric acid as is required to drive off completely the sulfurous acid. Allow this to cool, dissolve the vanillin in ether, draw off the ethereal solution, evaporate this, and crystallize the remaining vanillin from benzene.

I claim—

The process of manufacturing vanillin, consisting in boiling a watery solution of isoeugenol sodium and a sodium salt of halogen nitrobenzene sulfo-acid, producing isoeugenol phenylether nitrosulfate of sodium, oxidizing the isoeugenol phenylether nitrosulfuric acid to a salt of vanillin phenylether nitrosulfuric acid, and separating from this the vanillin by means of alkali; substantially as described.

In witness whereof I have hereunto set my hand in presence of two witnesses.

WILHELM MAJERT.

Witnesses:
PEREGRINE VARNALS,
W. HAUPT.